United States Patent
Darke

(10) Patent No.: US 6,579,562 B1
(45) Date of Patent: Jun. 17, 2003

(54) STABILIZING OF EXTRUDED VEGETABLE PROTEIN WITH THE ADDITION OF FURTHER SOLUBLE PROTEINS

(75) Inventor: Graham Robert Darke, Market Harborough (GB)

(73) Assignee: The Brecks Company Limited (GB)

( * ) Notice: Subject to any disclaimer, the term of this patent is extended or adjusted under 35 U.S.C. 154(b) by 0 days.

(21) Appl. No.: 09/724,261

(22) Filed: Nov. 28, 2000

(51) Int. Cl.[7] .................................................. A23J 1/00
(52) U.S. Cl. ........................ 426/656; 426/507; 426/516
(58) Field of Search ............................... 426/656, 516, 426/507

(56) References Cited

U.S. PATENT DOCUMENTS 3,922,352 A * 11/1975 Tewey et al.
4,612,203 A * 9/1986 Wong et al.
5,300,312 A 4/1994 Lusas et al.
5,773,070 A * 6/1998 Kazemzadeh

* cited by examiner

*Primary Examiner*—Anthony J. Weier
(74) *Attorney, Agent, or Firm*—Christensen O'Connor Johnson Kindness PLLC

(57) ABSTRACT

A food product is prepared by taking an undried or dried extruded piece of fibrous material, and combining the said piece with a protein based brine, flavors, salts and optional colorant, The extruded chunk and brine are combined under vacuum conditions for a period of time whereby the brine and soluble proteins therein are carried into the fibrous structure of the extruded chunk. This process is continued with gentle agitation of the product under vacuum until the required quantity of the brine is absorbed into the chunk. When the said absorption of the brine is complete, a known moisture content of the chunk will be achieved, with equal distribution of the solubilized proteins.

7 Claims, No Drawings

STABILIZING OF EXTRUDED VEGETABLE PROTEIN WITH THE ADDITION OF FURTHER SOLUBLE PROTEINS

This invention relates to a food product, and to a manufacturing process suitable for commercially producing the said food product. The invention relates particularly to an extruded food product.

BACKGROUND TO THE INVENTION

Existing extruded fibrous proteins require, post extrusion, the addition of water to open and soften the structure to produce a more organoleptically acceptable food product. This addition of water is absorbed by the extruded material, but can be lost during further processing, cooking or during eating, thus affecting the organoleptic properties of the product. Conversely when the textured protein is cooked in a high moisture sauce, unwanted absorption of water can be experienced, thus making the product soft, over-expanded and organoleptically unacceptable.

An objective of this invention is to stabilise the water content of an extruded piece, at a predetermined moisture level, thus imparting the required eating texture and stabilisation of the product. As a result of this stabilisation of water content, eating qualities, firmness, product colour and flavour can be controlled and thus standardised.

SUMMARIES OF THE INVENTION

According to one aspect of the invention I provide a method of manufacturing a food product by the addition of soluble proteins in the form of a homogeneous brine to an extruded textured protein piece under vacuum in a mixing vessel, and wherein the said proteins are then coagulated by means of heating, thereby stabilising the product.

By the addition of secondary introduced proteins carried into the product by a brine and then coagulated by means of heat, the water content of the piece is stabilised, thus reducing the tendency for water loss and absorption, thus facilitating a consistent finished product in terms of texture, size and organoleptic properties.

Preferably the protein elements in the said brine are selected from the group consisting of plant proteins, animal proteins, vegetable proteins, cereal protein, tuberous protein, fish protein, fungal protein, and derivatives and mixtures thereof.

The homogeneous brine is preferably based on a solution of water whereby the proteins are solubilised in the said water.

Flavourings and/or oil and/or colorants and/or salts may be contained in the homogeneous brine.

The make up of the brine, moisture level, quantity and type of added proteins such as soya and egg will all affect the resulting texture. Salt and flavour levels will affect solubility of the added proteins and also flavour and colour. These variables can be used to exhibit varying finished product textures and colours as required.

Said addition is made under controlled vacuum conditions in said mixing vessel in order to accelerate the diffusion of the brine into the textured piece, thereby carrying the soluble proteins and other materials into the structure of the textured protein.

The degree of agitation under vacuum can significantly affect the moisture content of the end product and thus impact the finished eating qualities, The degree of heating affects denaturation and coagulation of the proteinaceous brine post hydration.

The heating, which is preferably at atmospheric pressure but could be at some other pressure, is preferably carried out at a humidity above 75%, in order to coagulate the protein, thereby providing stability.

The said heating is preferably carried out at temperatures between 60° C. and 90° C., specific to the proteins used in the said proteinaceous brine.

UTILITY OF THE INVENTION

Essentially, the process enables an extruded textured piece of fibrous protein to be stabilised with regards to its eating qualities.

By stabilisation, it is possible to manufacture a textured material from non meat protein, which has many of the visual and eating qualities of cooked meat protein.

The extruded textured piece can be in many different forms, size, shape, colour, degree of texturisation and ingredient make up. These differences will be carried through the whole stabilisation process, and will affect the finished product.

DESCRIPTION OF PREFERRED EMBODIMENTS

The starting materials for the addition process are an extruded textured piece and a proteinaceous brine.

Extruded Textured Piece—Mixtures of one or more sources of protein blended with carbohydrate, water and other minor ingredients are then processed through a cooker extruder preferably, but not limited to, a co-rotating twin screw cooker extruder.

Proteinaceous Brine—A mixture of proteins solubilised in a quantity of water and combined with salts, flavourings and colorants. A homogeneous brine is mixed by the use of a high speed impeller mixer of high shear.

Combining of the primary ingredient, the expanded textured protein piece, and the proteinaceous brine is performed in a suitably sized vessel equipped with baffles for agitation and a pump to produce a vacuum within the vessel. At this stage the brine is absorbed, and the proteins solubilised within the brine are carried into the textured piece by means of diffusion, and reside between the fibres of the textured piece, still in solution. Added flavours and salts are also carried into the structure of the textured piece with the brine.

Once the textured piece and the brine have been combined, the material is transferred to a means of cooking the material at atmospheric pressure This cooking is achieved by heating the material in a high humidity environment to a temperature where the added proteins will coagulate and denature, thus stabilising the material. The range of temperature used may be between 60° C. and 90° C., with a relative humidity of above 75%.

Example Formulation

The Complete Finished product is a combination of the Brine and Extruded Chunk in varying proportions.

| Brine (Usage 50%–70%) | | |
| --- | --- | --- |
| Contains: | Water | 80%–95% |
| | Egg Albumin | 3%–10% |
| | Soya Protein | 1%–5% |
| | Flavourings | 0%–2.5% |

-continued

Brine (Usage 50%–70%)

| Colorants | 0%–1% |
|---|---|
| Salt | 0.5%–2% |

Extrude Chunk Example 1 (Usage 30%–50%)

Contains Varying proportions of the following:

Soya Protein

Soya Fibre

Starch

Wheat Gluten

Vegetable Fat

Extruded Chunk Example 2 (Usage 30%–50%)

Contains Varying Proportions of the following:

Pea Protein

Cereal Fibres

Starch

Wheat Gluten

Vegetable Fat

I claim:

1. A method of manufacturing a food product by the addition of soluble proteins in the form of a homogeneous brine to an extruded textured protein piece under vacuum in a mixing vessel, and wherein the said proteins are then coagulated by heating, thereby stabilising the product.

2. The method of claim 1, wherein the protein elements in the said brine are selected from the group consisting of plant proteins, animal proteins, vegetable proteins, cereal protein, tuberous protein, fish protein, fungal protein, and derivatives and mixtures thereof.

3. The method of claim 2 wherein the homogeneous brine is based on a solution of water whereby the proteins are solubilised in the said water.

4. The method of claim 2 wherein the homogeneous brine also contains added flavourings, oil, colorants or salts.

5. The method of claim 1 wherein said addition is made in said mixing vessel under controlled atmospheric conditions, whereby diffusion of the brine into the textured piece is accelerated.

6. The method of claim 1 wherein said heating is performed at a humidity above 75%.

7. The method of claim 1 wherein said heating is carried out at temperatures between 60° C. and 90° C.

* * * * *